Jan. 16, 1940.     P. WHITCOMB     2,187,188
VARIABLE SPEED PULLEY
Filed Oct. 5, 1939     2 Sheets-Sheet 2
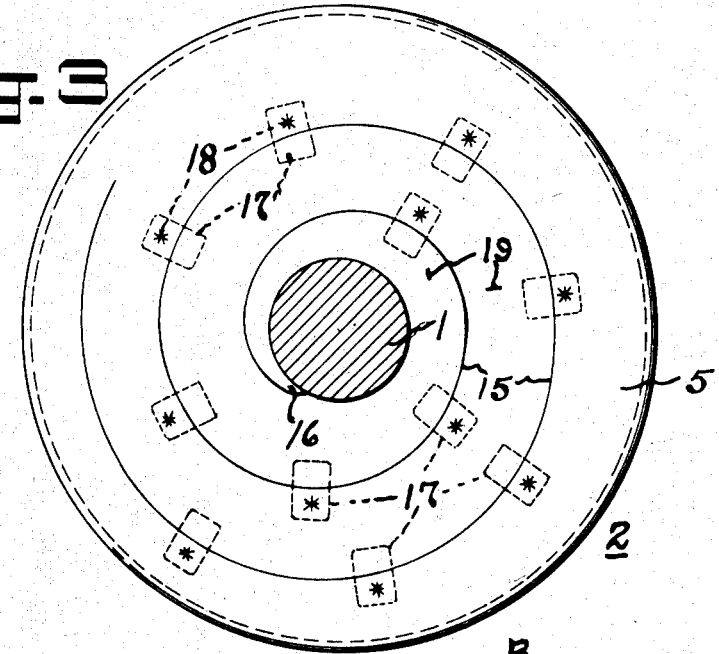
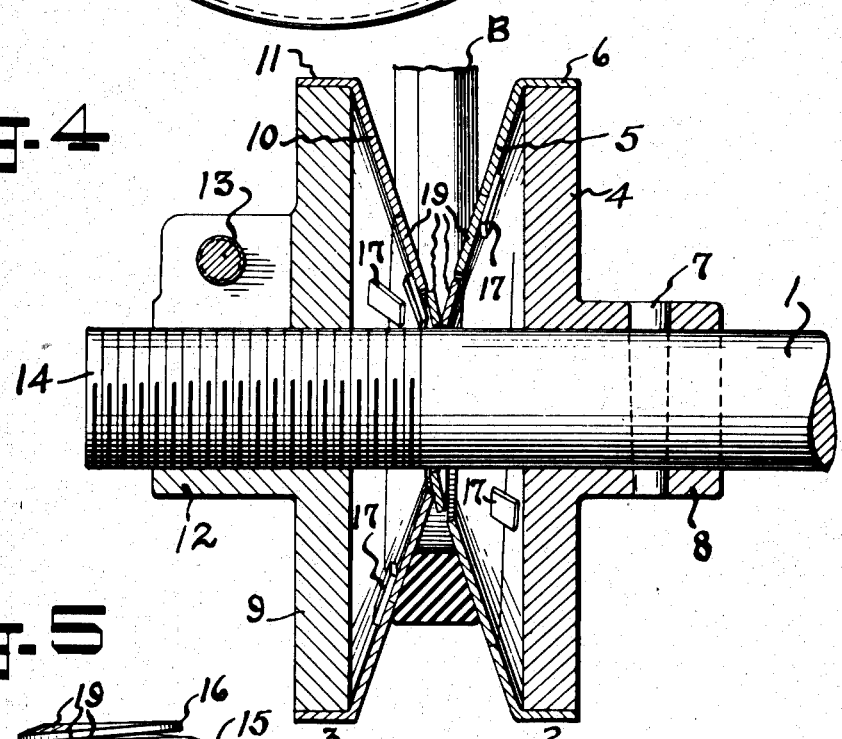
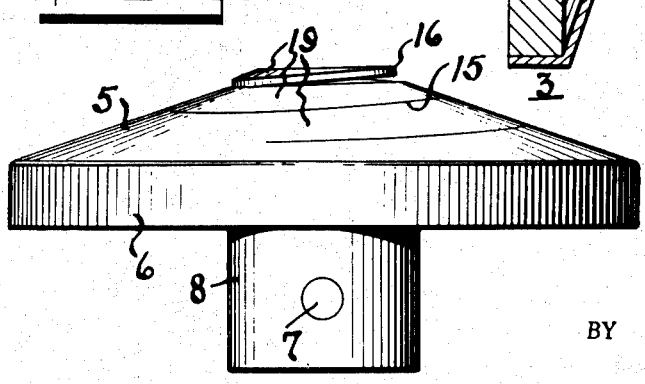
INVENTOR.
Preston Whitcomb
BY
Darby & Darby
ATTORNEYS Patented Jan. 16, 1940

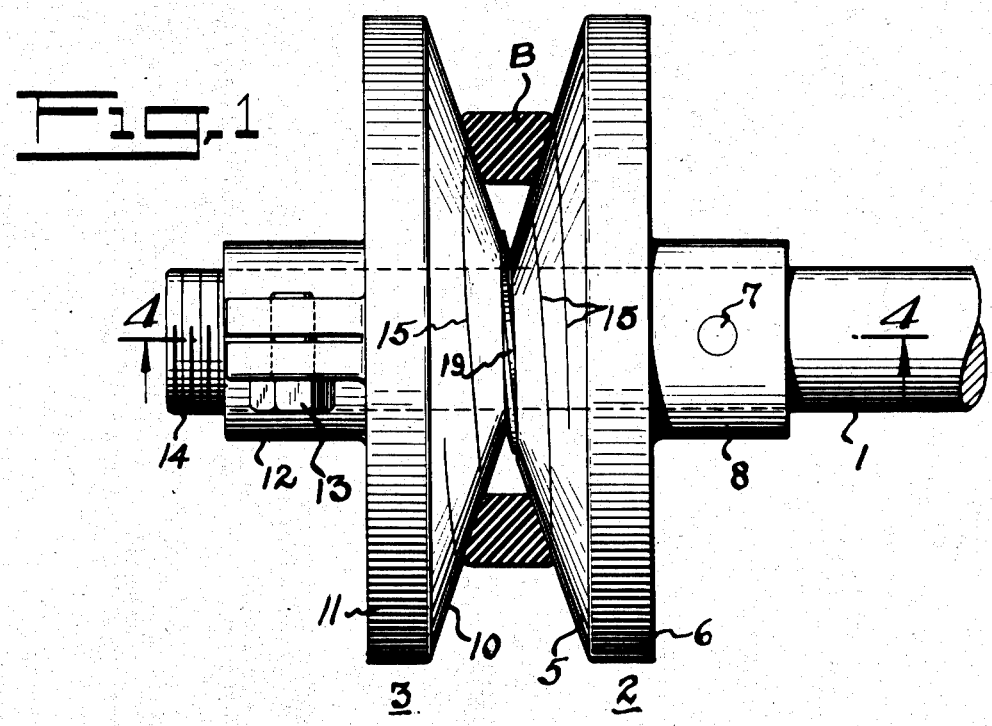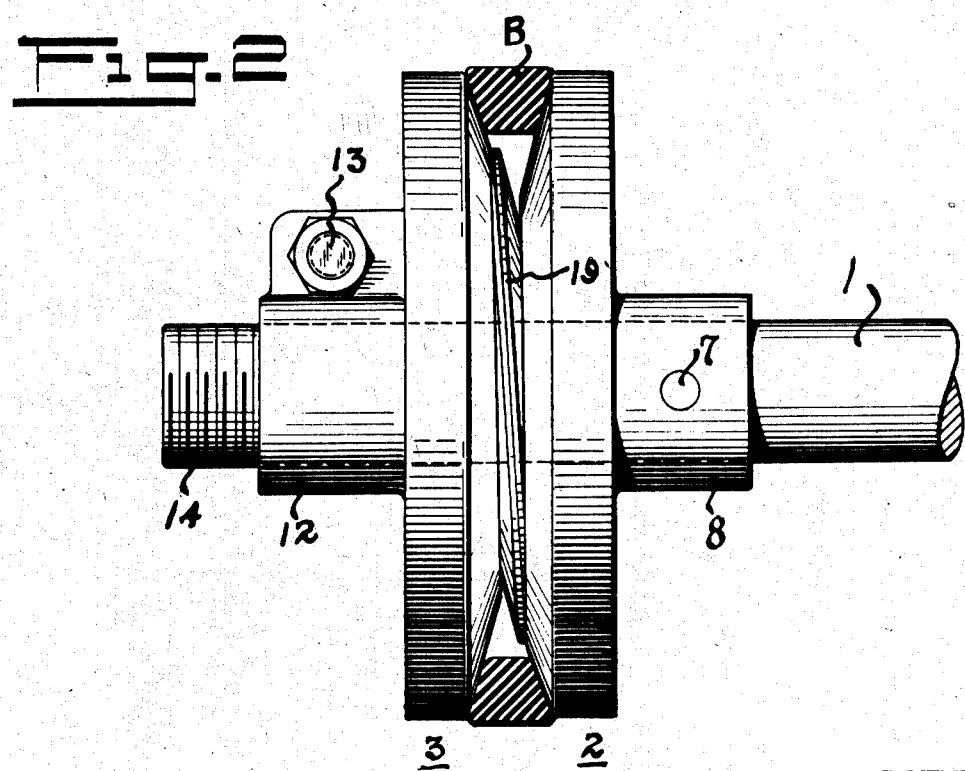

2,187,188

UNITED STATES PATENT OFFICE 2,187,188

VARIABLE SPEED PULLEY

Preston Whitcomb, Watertown, Mass., assignor to Manning, Maxwell & Moore, Inc., New York, N. Y., a corporation of New Jersey Application October 5, 1939, Serial No. 298,017

13 Claims. (Cl. 74—230.17)

This invention is concerned with improvements in pulleys, particularly those of the type used with wedge or V-shaped belts.

The general object of the invention is to provide a novel, simple and inexpensive structure by means of which V-pulleys may be quickly and easily adjusted for various speeds of operation of any driven apparatus with which they may be suitably used.

The specific details and objects of this invention will be apparent from the following detailed description of one form thereof when taken in connection with the attached drawings.

This invention resides substantially in the combination, construction, arrangement and relative location of parts, all in accordance with this disclosure.

In the accompanying drawings:

Figure 1 is an elevational view of a V-pulley in accordance with this invention showing the relationship which the belt bears thereto for one speed of operation;

Figure 2 is a similar view with the V-pulley adjusted for a different speed of operation;

Figure 3 is a front elevational view of one-half of the pulley of this invention showing the shaft in cross-section;

Figure 4 is a cross-sectional view taken on the line 4—4 of Figure 1; and

Figure 5 is a top plan view of one of the pulley halves removed from the shaft.

Heretofore there have been many efforts made to provide in various forms adjustable V-pulleys for the purpose of adapting them to variable speed conditions. One prior form of variable speed pulley of this type has the disadvantage of being relatively expensive to manufacture and by reason of the construction employed subject to the serious difficulty that it rapidly wears out the belt operating in conjunction therewith. In this type the two halves of the pulley are radially slotted so that they may be interleaved with each other. Another type of prior V-pulley is provided with concentric circumferential recesses so as to interleave, but this pulley is expensive and complicated. A still further type of prior V-pulley is one in which variable speeds may be secured in steps but the construction employed is exceedingly complicated and expensive. There is still another type of prior adjustable V-pulley which is relatively simple in structure but which is not capable of a very wide range in speed variation.

The outstanding characteristics of the adjustable V-pulley of this invention are its simplicity, both structurally and functionally, its inexpensiveness, the fact that by reason of the construction employed the life of the belt is in no way reduced, it is adjustable for relatively wide speed variations, and finally it is very simply and easily adjustable throughout the wide range of speeds for which it is capable of adjustment.

Referring to the drawings, there is shown at 1 a shaft upon which the V-pulley is mounted. This shaft may either be the shaft of a driven device, such as a machine, or it may be the driving shaft, such as of a power source. The pulley itself comprises two generally symmetrical parts, indicated by the reference numerals 2 and 3. As clearly shown in Figure 4, the pulley half 2 comprises a disc 4 having an integral hub 8 which fits the shaft 1 and by which it may be attached to the shaft by means of the key or pin 7. Mounted upon the disc 4 is a truncated conical shell 5 which is flanged, as indicated at 6, at its base so as to form a snug peripheral fit with the disc 4. This shell may be attached to the disc in any suitable manner, as by welding, by means of screws, pins, bolts, or the like. The shell is truncated by reason of the fact that its apex has disappeared at the center where a circular passage is provided through which the shaft 1 projects.

The other pulley half is generally similar to that just described in that it consists of a disc 9 with an integral hub 12 which is internally threaded for cooperation with the threads 14 on the shaft 1. The hub in this case, however, is provided with a slotted wing, as is clear from the Figures 1 and 4, and provided with a tightening bolt 13 by means of which this pulley half is locked to the shaft 1 when adjusted. A truncated conical shell 10 with a peripheral flange 11 at its base for engagement with the periphery of the disc 9 is provided as before. The shell 10 is attached to the disc 9 in any suitable manner, as explained above. The shaft 1, as shown in Figure 4, passes through a central circular opening in the shell so that the two pulley halves face each other.

Each conical shell is sheared on a spiral line 15, as is clear from the drawings. The shear line preferably conforms to an Archimedian spiral and the shell is sheared completely through so that a spiral strip is formed, the convolutions 19 of which are free with respect to each other. Secured to the inner face of the shell so as to overlap the shear line at suitably spaced points are a series of lugs 17 which are spot-welded in place, as indicated at 18. This leaves the spiral convolutions free to pull outwardly, that is, away from the disc, but prevents them from moving inwardly. As is clear from the drawings, each of the pulley halves is structurally the same in the shear cut and the lugs. The free terminal end of the innermost convolution, as indicated at 16, is preferably sprung out a bit, as indicated in Figure 5, for a purpose about to be explained.

Mathematical consideration will indicate that the width of the convolutions 19 after they attain a uniform width is approximately equal to the width of the belt used therewith, and in the case of a ¾ inch V-belt would be about ⅝ inch wide. For a structure of this size the lead of the thread 14 and the cooperating thread on the hub 12 should be about 0.193 inch.

Figure 1 shows the pulley halves adjusted so that the belt B rides well down in the pulley groove. In this case the left hand pulley half 3 has been moved towards the right hand pulley half 2 by loosening the locking bolt 13 and turning the pulley half 3 to the position shown, at which time the ends of the inner spiral convolution have overlapped each other. In order to increase the speed of operation of shaft 1, the pulley halves are drawn nearer together. To accomplish this, the bolt 13 is again loosened and the pulley half 3 is rotated so that the threaded engagement between its hub 12 and the threads 14 cause it to move towards the pulley half 2. At this time the spiral convolutions of the shells have overlapped to a greater extent, those of one shell running in back of those of the other, as clearly indicated in Figure 2. When adjusted, the pulley half 3 is locked in place by tightening the screw 13. By this procedure, the two halves may be moved, relatively speaking, nearer or further apart so that the belt B may be caused to ride up on the groove, as indicated in Figure 2, or further down therein, as indicated in Figure 1. The sprung out tip 16 of the innermost convolution of each pulley half facilitates the initial interleaving of the convolutions of the two pulley halves.

An important feature of this construction, in addition to its structural simplicity and the facility with which it may be adjusted, is found in the fact that the belt B at no time rides on an uneven surface. In other words, the spiral convolutions are caused by a shear cut so that no metal is removed, with the result that no sharp edged slots are formed to cut the belt. Furthermore, the pressure of the belt forces the free convolutions back into the plane of the shell and these convolutions may not go inwardly of that plane because of the presence of the stops 17. At the same time, they are free to come outwardly of that plane as the shells are more and more interleaved. However, as is clear from Figures 1 and 2, no matter what position the two pulley halves take, the belt does not ride on a portion thereof which projects outwardly of the shell surface. Thus at no time is any cutting edge in engagement with the belt by reason of this construction. Thus for all practical purposes the pulley acts as though it has smooth continuous surfaces, notwithstanding the spiral shear lines.

It is to be noted that the structure herein disclosed may be used without a threaded engagement between one pulley half and the shaft, the interleaving of the two halves being as readily produced by the overlapping of the spiral convolutions. However, it is desirable as a practical matter to provide this threaded engagement so as to provide a double assurance for the proper functioning of the device and at the same time to contribute to the locking of the unpinned pulley half to the shaft after adjustment. It is also apparent that other means may be provided for securing the relatively free pulley half to the shaft.

From the above description it will be apparent to those skilled in the art that the various features of novelty comprising this invention are subject to variation without departure from the novel scope of this invention. I do not, therefore, desire to be strictly limited to the disclosure which has been given solely for purposes of illustration but prefer to be limited by the true scope of the claims granted me.

What I claim is:

1. A pulley, comprising a pair of similar conical shells, each shell being sheared on a spiral line to form free spiral convolutions, and means for adjustably supporting said shells in concentric alignment with said convolutions partially overlapped.

2. A pulley, comprising a pair of similar conical shells, each shell being sheared on a spiral line to form free spiral convolutions, means for holding said convolutions against movement inwardly of the faces of said shells, and means for supporting said shells in concentric alignment with said convolutions overlapped.

3. A pulley of the type described, consisting of two parts, each including a conical portion sheared therethrough on an Archimedian spiral to form spiral convolutions, the convolutions of said two parts being more or less overlapped to vary the depth of the belt groove formed thereby.

4. A combination as described, comprising a shaft, a pair of conical shells mounted on said shaft, and means for locking said shells to said shaft, said conical shells being composed of spiral convolutions which may be more or less overlapped to vary the radius of the belt groove formed thereby.

5. A combination as described, consisting of a shaft, a hollow conical shell mounted on said shaft and secured thereto, a second hollow conical shell mounted on said shaft, and means for releasing said second shell from or locking it to said shaft, said shells being composed of spiral convolutions which may be progressively overlapped by relative rotational movement.

6. A combination as described, consisting of a shaft, a hollow conical shell mounted on said shaft and secured thereto, a second hollow conical shell mounted on said shaft, means for releasing said second shell from or locking it to said shaft, said shells being composed of spiral convolutions which may be progressively overlapped by relative rotational movement, and means secured to said convolutions to hold them against movement inwardly of the conical surface of said shells.

7. A combination as described, comprising a shaft, a pulley portion secured to said shaft having a conical face, and a second pulley portion mounted on said shaft and threadedly engaging it, said second pulley portion having a conical face, the conical faces of said pulley portions being composed of spiral convolutions which may be adjustably overlapped to vary the radius of the belt groove formed thereby.

8. A combination as described, comprising a shaft, a pulley portion secured to said shaft having a conical face, a second pulley portion mounted on said shaft and threadedly engaging it, said second pulley portion having a conical face, the conical faces of said pulley portions being composed of spiral convolutions which may be adjustably overlapped to vary the radius of the belt groove formed thereby, and means for locking the second pulley portion to the shaft.

9. A combination as described, comprising a shaft, a pulley portion secured to said shaft having a conical face, a second pulley portion mounted on said shaft and threadedly engaging it, said second pulley portion having a conical face, the conical faces of said pulley portions being composed of spiral convolutions which may be adjustably overlapped to vary the radius of the belt groove formed thereby, and stop members secured to the inner surfaces of said convolutions to limit their inward movement.

10. A combination as described, comprising a shaft, a pulley portion secured to said shaft having a conical face, a second pulley portion mounted on said shaft and threadedly engaging it, said second pulley portion having a conical face, the conical faces of said pulley portions being composed of spiral convolutions which may be adjustably overlapped to vary the radius of the belt groove formed thereby, means for locking the second pulley portion to the shaft, and stop members secured to the inner surfaces of said convolutions to limit their inward movement.

11. A variable speed pulley as described, including a shaft, a pair of truncated conical members mounted on said shaft with their smaller ends adjacent each other, means for locking one of said members to the shaft, and means for adjusting the other of said members rotationally and longitudinally with respect to the other, said conical members in part being composed of relatively free spiral convolutions overlapping each other.

12. A combination as described, consisting of a shaft, a pair of conical members mounted on said shaft facing each other to form a V-belt groove, means for locking one of said members to the shaft, and means comprising threads on the shaft and threads on the other of said members for effecting axial adjustment of that member with respect to said first member, said conical members being constructed so as to interengage spirally.

13. An adjustable V-pulley, comprising a pair of substantially similar conical pulley sections positioned with respect to each other to form a V-shaped belt groove, each section consisting of a truncated conical shell and a disc secured thereto at the base, and a hub for attachment to a shaft, each shell being composed of relatively free spiral convolutions.

PRESTON WHITCOMB.